T. R. EDMONDSON.

VEHICLE BED.

APPLICATION FILED SEPT. 3, 1914.

2 SHEETS—SHEET 1.

Reissued Oct. 6, 1914. 13,805.

Inventor

T. R. Edmondson.

Witnesses

Dudley Browne

Wm. Zeaman

By Chas. E. Phelps

Attorneys

T. R. EDMONDSON.

VEHICLE BED.

APPLICATION FILED SEPT. 3, 1914.

2 SHEETS—SHEET 2.

Reissued Oct. 6, 1914.

13,805.

Inventor

T. R. Edmondson

Witnesses

Dudley Browne

Wm. Seaman

By Prescott Phelps

Attorneys.

UNITED STATES PATENT OFFICE.

THOMAS R. EDMONDSON, OF TUCSON, ARIZONA, ASSIGNOR OF ONE-HALF TO EDWARD G. SPORLEDER, OF TUCSON, ARIZONA.

VEHICLE-BED.

13,805. Specification of Reissued Letters Patent. Reissued Oct. 6, 1914.

Original No. 1,107,596, dated August 18, 1914, Serial No. 786,285. Application for reissue filed September 3, 1914. Serial No. 859,960.

*To all whom it may concern:*

Be it known that I, THOMAS R. EDMONDSON, a citizen of the United States, residing at Tucson, in the county of Pima and State of Arizona, have invented certain new and useful Improvements in Vehicle-Beds, of which the following is a specification.

This invention relates to vehicle bodies, and more particularly to that class of vehicle bodies adapted to be used in motor vehicles or automobiles for touring or camping purposes, and it has for its object to produce a vehicle body of the class described which may be easily converted into a bed.

A further object of this invention is to provide a vehicle body which shall be easily converted into a bed and which shall comprise the minimum number of parts.

A further object of this invention is to provide a convertible bed for automobile bodies which shall be inexpensive and readily applied to the form of body now in use.

With these and other objects in view this invention consists in the particular combination and construction of the parts of a convertible bed for an automobile body as hereinafter described and more particularly pointed out in the appended claim.

Figure 1:
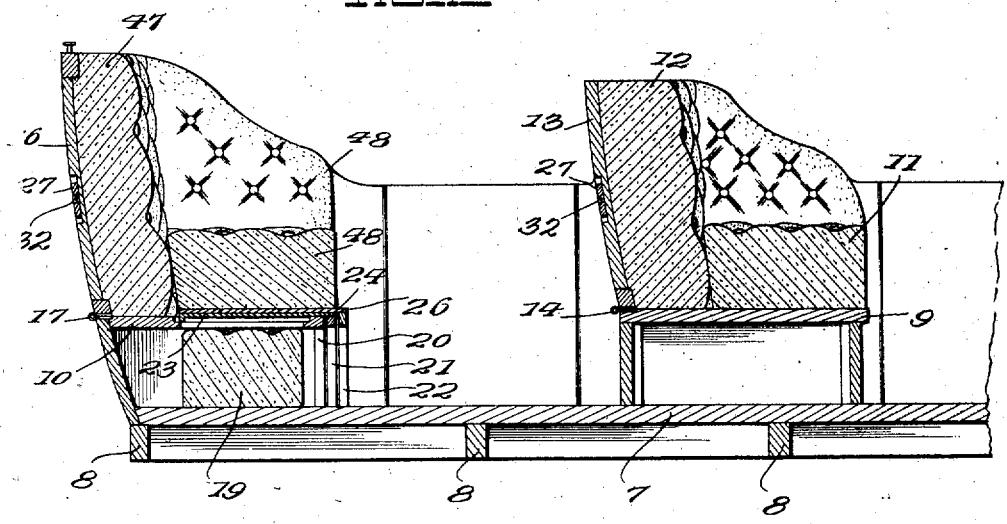
Figure 2:
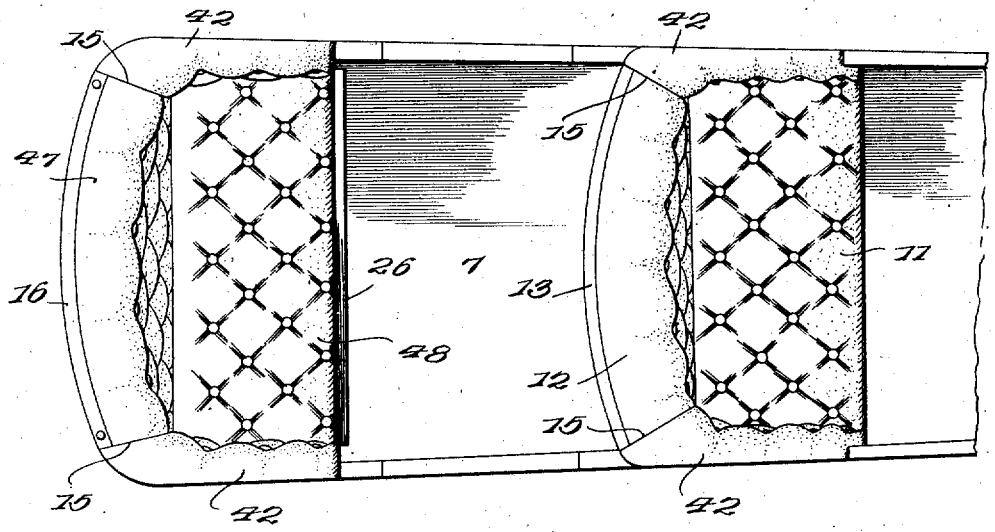
Figure 3:
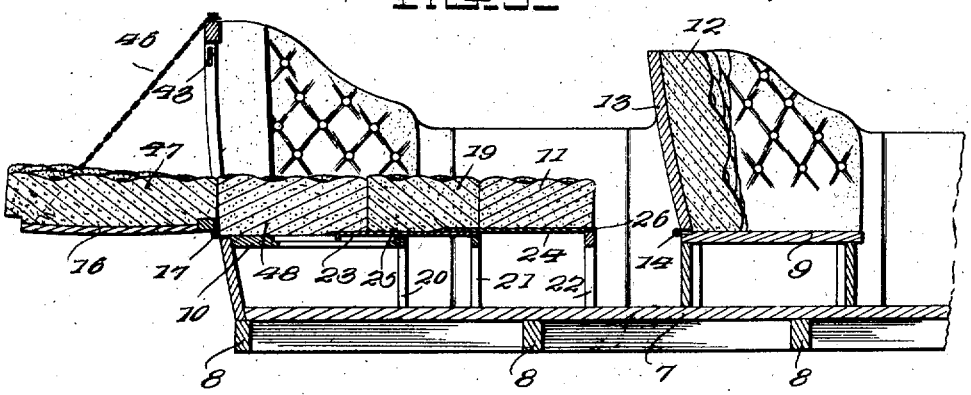
Figure 4:
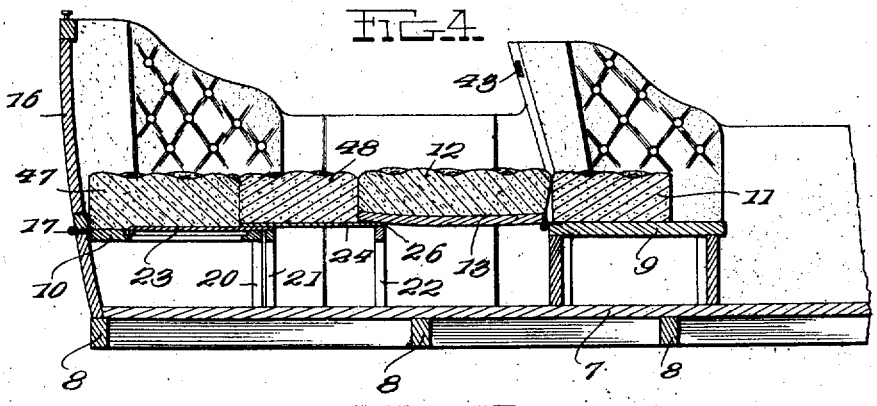
Figure 5:
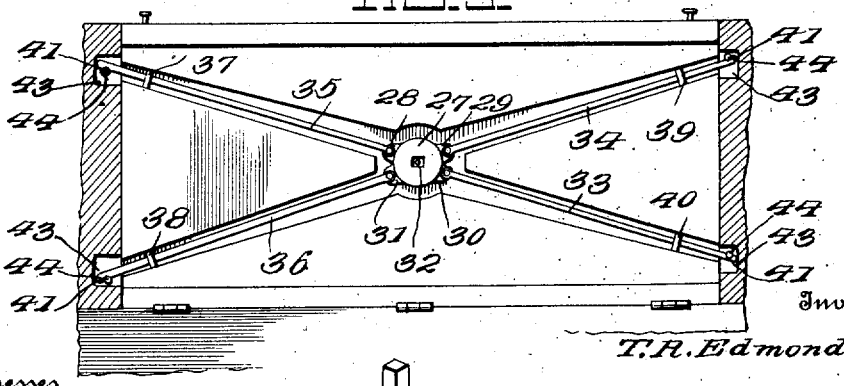
Figure 6:
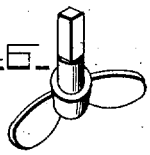

Referring to the drawings forming a part of this specification wherein similar reference numerals indicate similar parts wherever used Figure 1 is a sectional side elevation of an automobile body embodying my construction shown in closed position or not for use. Fig. 2 is a top plan view of the same. Fig. 3 is a sectional side elevation showing one form of convertible bed. Fig. 4 is a sectional side elevation showing another form of convertible bed. Fig. 5 is a detail of the locking device for several of the members. Fig. 6 is a key for actuating said locking device.

7 represents the floor of the car provided with any suitable body, preferably that known as "five-passenger fore door type" and adapted to rest upon the chassis by means of the sills 8. Mounted upon the floor 7 are the usual front and back seats, designated at 9 and 10 respectively. The front seat 9 carries a removable seat cushion 11 and a back cushion 12 removably fastened to the back of said seat. The back 13 of the front seat 9 is hingedly connected at 14 and is cut out at 15, 15, which permits the back 13 to be lowered as shown in Fig. 4. The back 13 is held in its upright position by means of locking means illustrated in Fig. 5 and hereinafter described. The rear seat 10 is provided with a back 16 hingedly connected thereto at 17 and secured in the same manner as the back 13 of the front seat. Beneath the rear seat 10 is formed a recess 18 adapted to contain a cushion 19 to be placed therein when the bed is not in use. Adjacent the front leg 2 of the rear seat 10 are placed a plurality of uprights 21, 22, having attached to them at their upper edges right angled metal plates 23 and 24, adapted to extend rearwardly and over the seat 10. The member 23 has a downwardly projecting lug upon its rear edge adapted to contact with the upwardly projecting edge 25 of the front leg 20. The members 21 and 22 are free to slide along the floor 7, and the members 23 and 24 are adapted to ride one over the other in order to form a continuous platform from the hinge 17 to the point 26.

Each of the backs 13, 16 is provided with locking means (Fig. 5) comprising a central plate 27 rotatably mounted on the back thereof and having angular wings 28, 29, 30 and 31 extending therefrom, and provided with a squared central aperture 32. Extending outwardly through grooves cut in the back are bars 33, 34, 35 and 36, which are pivotally attached to the wing members 28, 29, 30 and 31 and are guided by means of eyes 37, 38, 39, 40. Each of the bars is provided at its outer end with a notch 41.

In the rigid portion of the back adjacent the cut out portion 15, as shown at 42, are formed recesses 43 having therein pins 44 adapted to be engaged by the notches 41 of the rods 33, 34, 35 and 36. In this position the back is locked securely in place by means of the rods which engage the pins as heretofore stated. When it is desired to unlock the same a key (Fig. 6) is inserted in the central opening 32 of the plate 27 and the plate given a slight rotation which causes the rods 33, 34 and 35 to become disengaged from the pins 44 and thus to allow the backs freedom of movement.

When it is desired to convert the vehicle body into a bed of the form shown in Fig. 3 the back 16 is unlocked as above described and lowered into the position shown in the said figure, where it is supported by means of a chain 46. The cushion 19 is removed from the aperture 18 under the seat 10, and the legs 21, 22 with their companion members 23, 24 slid forward to the position shown. The cushion 19 is then placed in front of the cushion of the back seat and, if necessary, the cushion 11 of the front seat may be placed upon the member 24, thus forming a continuous cushion or mattress of a length sufficient to accommodate a person. This form of bed is more particularly adapted for use while the machine is at a standstill or in permanent camp.

The form of bed shown in Fig. 4 is more particularly designed for use in touring and is constructed as follows: The back 16 is left in its raised position and the removable cushion thereof, represented at 47, is turned downward upon the seat 10, and the cushion 48 of said seat removed. The plate 23 is now brought forward with its companion member 24 and the cushion 48 of the back seat placed thereon. The back of the front seat 13 is then unlocked, as heretofore described, and lowered until the upper edge rests upon the point 26 of the member 22, thus forming a continuous bed from the back 16 to the front cushion 11.

In place of the cushions it may be desirable to carry an inflatable mattress, or one of ordinary construction, adapted to fit either of the constructions shown in Figs. 3 and 4.

Considerable variation of the details of my invention may be practised without departing from the spirit thereof, and it is not my intention to limit myself to the construction shown herein but to consider the claim as broadly as the state of the prior art will permit.

Having thus described my invention what I claim as new and desire to secure by Letters Patent is:

In a vehicle body, in combination, front and rear seats, hinged backs therefor locking means co-acting with the corners of each back and the sides of the seats to hold the backs in normal position, removable cushions associated with the back and seat portion of each, and means telescoping with one of said seats adapted to co-act with the back of the front seat to completely fill the space between the front and rear seats thereby permitting some of said removable cushions to be laid thereon to provide a smooth even bed.

In testimony whereof I affix my signature in presence of two witnesses.

THOMAS R. EDMONDSON.

Witnesses:

CHAS. H. SPORLEDER,

EDWARD G. SPORLEDER.